United States Patent [19]
Klynn

[11] 3,756,706
[45] Sept. 4, 1973

[54] MOTION PICTURE VIEWER

[76] Inventor: Herbert D. Klynn, 12754 Ventura Blvd., Tarzana, Calif. 91604

[22] Filed: June 5, 1972

[21] Appl. No.: 259,826

[52] U.S. Cl. ............................... 352/129, 352/128
[51] Int. Cl. ............................................ G03b 21/00
[58] Field of Search ............................ 352/129, 128

[56] References Cited
UNITED STATES PATENTS
2,311,204  2/1943  Bouma ............................ 352/129 X
3,446,551  5/1969  Platt ................................... 352/129

Primary Examiner—Monroe H. Hayes
Attorney—Lynn H. Latta

[57] ABSTRACT

An extremely inexpensive motion picture viewer consists of simply a drum-shaped casing having in its periphery at opposite sides thereof, a viewing lens and a light admitting window respectively, an endless coil of motion picture film within the casing, and a hand-cranked sprocket engageable therewith to orbit the coil in an intermittently advancing movement in a generally circular path adjacent the casing periphery, with one turn of the coil deflected to one side of the casing to intersect the optical path, and the remainder of the coil retained in the other side of the casing, in a plane offset laterally from the optical path.

9 Claims, 8 Drawing Figures

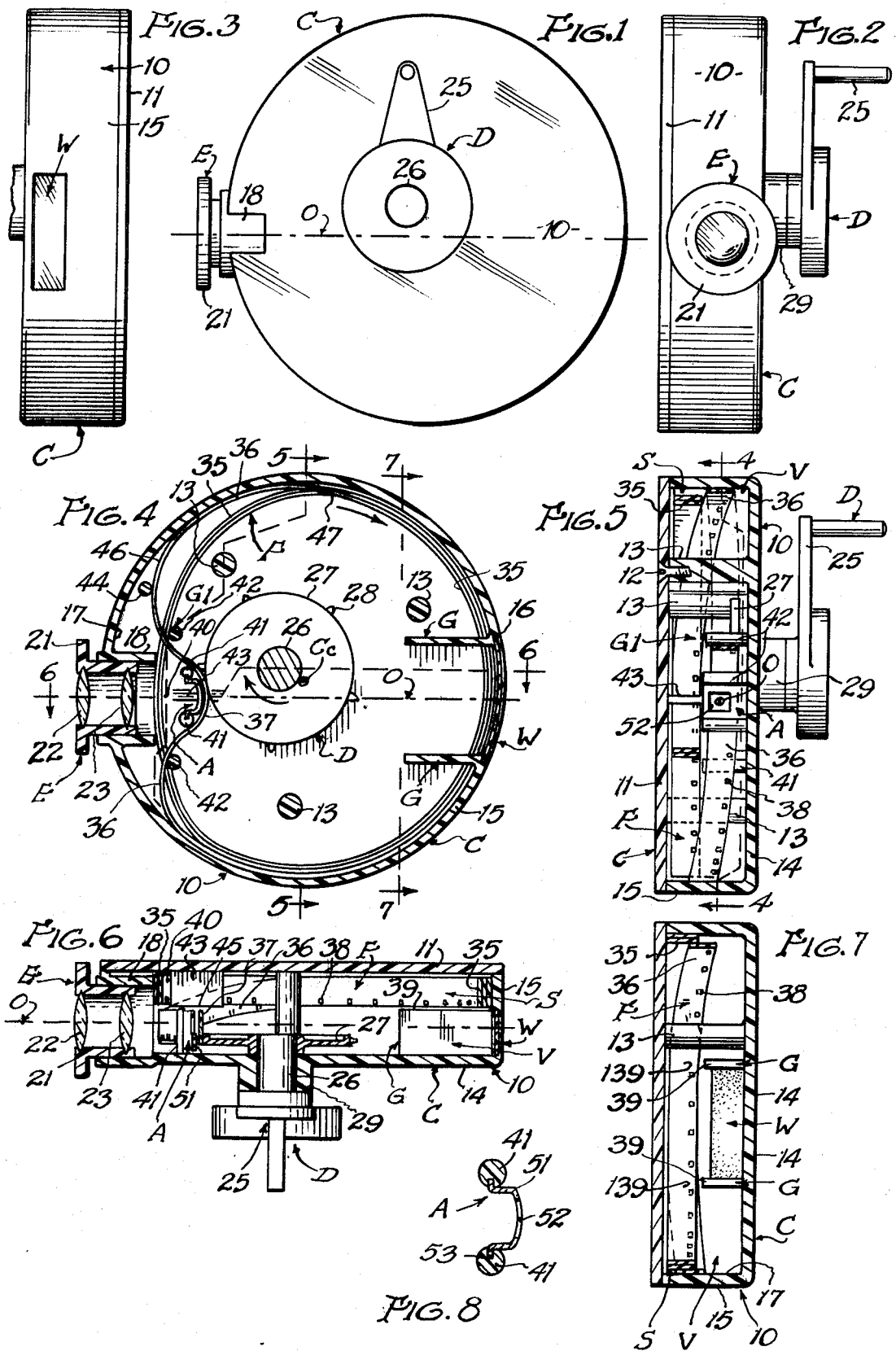

MOTION PICTURE VIEWER

BACKGROUND OF THE INVENTION

Efforts have been made heretofore to provide an inexpensive movie viewer which could be sold as a novelty or toy for casual entertainment of guests or for amusement of children. Such an effort is represented by Bouma U.S. Pat. No. 2,311,304, disclosing a novelty movie viewer having a hand-cranked sprocket for intermittently advancing an endless coil of movie film in a drum-shaped casing. This viewer, however, has not proved to be satisfactorily operable to drive the film in an uninterrupted series of advancing movements bringing each successive frame of the film into centered relation to the optical path, and although attempts have been made to market the device, such efforts have not been successful. The prior art is further exemplified by the following U.S. Pats:

| Farrell | 2,408,384 | Oct. 1, 1946 |
| Iwick | 2,449,483 | Sept. 14, 1948 |
| Roisman | 2,490,920 | Dec. 13, 1949 |
| Schrader | 3,139,789 | July 7, 1964 |
| Lester | 3,479,112 | Nov. 18, 1969 |
| Bouma | 2,605,674 | Aug. 5, 1952 |
| Bouma | 2,589,803 | March 18, 1952 |
| Bouma | 2,311,204 | Feb. 16, 1943 |

RESUME OF THE INVENTION

The general object of the present invention is to provide a viewer generally of the type disclosed in the above mentioned Bouma U.S. Pat. No. 2,311,304, in which there are improvements which eliminate the problems of faulty operation of that earlier device, and which provide reliable and satisfactory operation while minimizing cost of fabrication of the viewer. In attaining this general object, the invention utilizes a molded plastic casing of drum-shape, preferably circular, having an eyepiece and an integral translucent window at approximately diametrically opposite points in its cylindrical rim, an endless coil of movie film movable in a generally circular orbit adjacent its interior peripheral wall, a drive sprocket operable to intermittently advance the film a frame at a time, and a series of guide projections integral with respective flat sides of the casing and projecting inwardly therefrom to approximately the median plane of the casing parallel to said sides, said projections being positioned so as to deflect one turn of the coil to one side of the casing intersecting the optical path through the viewing lens and light admitting window, while positioning the remainder of the coil in a plane adjacent the opposite side of the casing. The sprocket is positioned closely adjacent the said one side of the casing and in tooth-intersecting relation to a reentrant bight of the film which intersects the optical path and resiliently engages the periphery of the sprocket in a relation such that the sprocket teeth will engage and disengage the film at its apertures in a positive manner such that frame-by-frame advancements of the film will be reliably effected.

Other objects will become apparent in the ensuing specification and appended drawing, in which:

FIG. 1 is a side elevational view of a viewer embodying the invention;

FIG. 2 is an end elevational view looking toward the eyepiece as the viewer is held for use;

FIG. 3 is an end elevational view of the back of the viewer;

FIG. 4 is a sectional view taken as indicated by line 4—4 of FIG. 5;

FIG. 5 is a vertical cross-sectional view taken on line 5—5 of FIG. 4;

FIG. 6 is a horizontal sectional view taken on line 6—6 of FIG. 4;

FIG. 7 is a vertical sectional view taken on line 7—7 of FIG. 4; and

FIG. 8 is a detail vertical sectional view of the aperture plate.

DESCRIPTION

Referring now to the drawing in detail, I have shown therein, as an example of one form in which the invention may be embodied, a viewer comprising, in general, a casing C of molded plastic material and of flat, cylindrical drum form having an integral translucent light-entry window W and an eyepiece E in the cylindrical rim at approximately diametrically opposite points on an optical axis O extending generally diametrically; a driving unit D for intermittently advancing a coil of movie film F in a generally circular path orbiting adjacent the inner wall of the casing rim; and past an aperture plate A behind eyepiece E; and guide projections G and G1 arranged in groups adjacent the window W and eyepiece E respectively.

Casing C is of opaque material except for window W, which is translucent (either of translucent material or of transparent material with a frosted surface) its translucency approaching transparency sufficiently to transmit diffused light of substantially undiminished intensity from a light source toward which the user will point the viewer while looking through the eyepiece E at the film F through which the light will shine. The casing is constructed in two sections 10 and 11 detachably secured together (e.g., by screws 12 extending through flat cover section 11 into bridging tie-posts 13 integral with and projecting from a flat side wall 14 of casing section 10). Section 10 includes the cylindrical rim 15 in which window W is integrally embodied, either as a separate part cemented into a framing bezel groove 16 in rim 15, or as a thinned section of the rim omitting an opaquing coating 17 (FIG. 7) covering the remainder of the surface of the casing section 10 (or the entire casing). In the rim 15 at a point approximately diametrically opposite window W is an integral boss 18 of cylindrical collar form, in which the eyepiece E is mounted with a light frictional fit such as to permit axial adjustment of the eyepiece into focus with a reentrant loop 37 of film F intersected by the optical axis.

Eyepiece E comprises a cylindrical barrel 21 and a pair of lenses 22, 23 mounted therein in proper spacing for focusing on the film loop 37. The barrel 21 and the optical axis 0 are offset laterally to one side of a plane parallel to casing side walls 14 and 11 (cover). In the arrangement shown the optical axis is centered in a viewing area V in the right half of the casing as viewed in FIGS. 2 and 5 (the position of the viewer as faced by the user when viewing a movie). The optical axis is positioned below the center Cc of casing C. A storage area S, for film F, is provided in the opposite side of casing C.

Drive unit D comprises a hand crank 25 secured on the outer end of a shaft 26 journalled in a boss integral with casing sidewall 14, and a sprocket 27 secured on the inner end of the shaft closely adjacent sidewall 14 (FIG. 6). Sprocket 27 has a few teeth 28 widely spaced around its perimeter, five teeth being suitable for a sprocket proportioned as shown. The axis of driving unit D is positioned above the casing center Cc and forwardly (toward eyepiece E) of center Cc.

A length of 8mm. film with a succession of movie image frames thereon has its ends attached together to provide the endless film F which is arranged in the form of a coil of multiple idling turns 35 coiled inside one another, and a laterally deflected single turn 36 which includes the reentrant loop 37. Coil 35 is retained in the storage area S (FIG. 5) in one side of the casing C for idling rotation along the internal bearing surface of rim 15. About half of single turn 36, in the forward (eyepiece) area of the casing, is deflected laterally from storage area S into viewing area V at the opposite side of the casing, where the reentrant loop 37 is substantially bisected by the optical axis 0, the image frame being centered on the optical axis as they arrive at intersecting relation therewith. Drive apertures 38 of the loop reentrant 37 are disposed adjacent casing sidewall 14 and in the plane of sprocket 27, so as to be engageable by sprocket teeth 28.

Guide projections G are in the form of rectangular lugs projecting inwardly toward the casing center Cc from the upper and lower extremities of window W, parallel to axis 0 and spaced substantially above and below the axis. They are integrally joined to rim 15 at their outer ends and to sidewall 14 along their longitudinal margins at that side. From sidewall 14 they project to or slightly beyond the median plane of casing C (midway between its sides) and terminate in free longitudinal margins 39 (FIGS. 6 and 7) which function as bearing lands engageable by idling turns 35 to maintain them in storage area S. Guide projections G also function to shade window W, reducing vertical spreading of the light rays entering the casing through the window, thus intensifying the image seen against the illuminated window. As the film coil F is rotated, the idling turns 35 will slide through gaps 139 (FIG. 7) which are defined between the free longitudinal margins 39 of guides G and sidewall 11; and through a gap 40 provided rearwardly of boss 18 (FIG. 4).

Guides G1 comprise pairs of guide bars 41 and 42 projecting laterally from sidewall 14 (FIGS. 4 and 5). Guides 41 bear against the outer face of laterally deflected film turn 36 and are spaced inwardly from rim 15 opposite the top and bottom extremities of eyepiece E a distance such as to develop inward looping at 37 sufficient to maintain reentrant loop 37 yieldingly engaged against the periphery of sprocket 27. Guide bars 42 bear against the opposite face of turn 36 at positions at greater spacing from optical axis 0 than bars 41 and closer to rim 15. The guides 42 thus confine the sides of reentrant loop 37 against spreading and at a spacing from one another such that the central arch (crown) of loop 37 will maintain adequate curvature for the necessary yielding engagement with sprocket 27, with a radius substantially smaller than that of the sprocket periphery.

Guide projections G1 further include a guide lug 43 disposed in storage area S and projecting laterally from sidewall 11 to or slightly beyond the median plane of casing C. Lug 43 terminates in a longitudinal free edge 45 (FIG. 6) operative as a bearing land against which the edge of reentrant loop 37 may slide. Thus it confines loop 37 laterally so as to maintain its image frames centered on optical axis 0. Lug 43 is positioned laterally of the image path along the axis 0. It is on the opposite side of the axis from lugs G. It is spaced from the rear end of boss 18 to define the gap 40 through which film coils 35 may pass the optical axis without intersecting it.

Guides G also include a guide bar 44 disposed outwardly of upper guide bar 42 and engaging the outer face of film turn 36 to guide a transition bend 46 extending from reentrant loop 37 where it leaves sprocket 27, into the peripheral portion of turn 36 returning to idling turns 35. Transition bend 46 will bear against the inner surface of rim 15 and will then bend inwardly at 47 in a spiral path to become the inward turn 35, being also deflected laterally to reenter the storage area S. Coil rotation is indicated by arrow in FIG. 4. Reentry of turn 36 into storage area S is enforced by guides G which provide the gaps 139 (FIG. 7) through which the idling turns 35 must pass in order to rotate in storage chamber S. The beginning portion of turn 36, after leaving the lower gap 139, will leave the outer turn of multiple idling turns 35 and deflect laterally in order to pass over lug 43 (after passing around lower guide bars 42, 41) thus developing the reentrant loop 37 in viwing chamber V.

Aperture plate A (FIG. 8) comprises an arcuate central body 51 having a framing aperture 52 therein, and end tabs 53 anchored to guide bars 41. The convex rear face of body 51 provides a bearing surface operative to limit any deflection of loop 37 toward eyepiece E by driving engagement of sprocket 27, sufficiently to maintain such driving engagement for a distance such as to advance the film one frame.

As indicated by the arrow in FIG. 4, the movement of the sprocket tooth in driving engagement with the film, is upward. Due to the location of the optical axis and the reentrant loop 37 below the casing center and the location of the sprocket axis above the center, the sprocket rim will engage the loop 37 above its crown (the midpoint of its inwardly arched portion) and each successive sprocket tooth will establish initial driving engagement with reentrant film loop 37 at about the point of arrival of the tooth at the crown, abreast the optical axis. Since the crown of loop 37 is substantially midway between bearing bars 41 and therefore of maximum yieldability, the approaching sprocket tooth 28 will smoothly enter the corresponding sprocket aperture in the film without missing, and will remain in engagement with the film until it is near the upper guide bar 41, a distance just sufficient to advance the film the length of one image frame. The sprocket tooth will then disengage the film, leaving it stationary for an instant-long enough for the projected image to be impressed on the retina of the user's eye. At the end of this stop period, the next sprocket tooth will engage the resilient crown portion of reentrant loop 37, advancing the film another frame. Thus, by slowly turning the crank 25 at a uniform rate, the successive frames of the film will be illuminated to provide an intermittent succession of images producing the "moving picture" effect of the conventional cinema operation.

Continuous engagement of the crown portion of reentrant loop 37 with the periphery of sprocket 27 is the result of its being guided around outer sides of the outer pair of guide bars 42 and around inner sides of the inner pair of guide bars 41 and upon the central body 51 of aperture plate A, the outer guide rods 42 confining the sides of loop 37 so as to cause them to bear against inner rods 41 in a manner to protrude the crown portion of the loop toward the sprocket 27, with light, yielding pressure against the sprocket's periphery.

In the gap 40 the several idling turns 35 of stored film travelling from the bottom to the top of the storage chamber S along a generally chordal path spaced radially inwardly from the casing rim at the eyepiece, are radially confined between the inner end of eyepiece boss 18 and guide lug 43, and are further comfined, against lateral displacement from storage chamber S, by the overriding reentrant film loop 37, the path of which is crossed by turns 35 at points above and below the eyepiece E. On the other hand, the reentrant loop 37 is confined against lateral displacement from viewing chamber V by the lug 43 and the idling turns 35, interposed between its edge and chamber S. The function of lug 43 in retaining the crown portion of reentrant loop 37 against displacement laterally toward chamber S, is made certain by extension of lug 43 toward the center of the casing past the periphery of sprocket 27, in crossed relation to loop 37.

While it is preferred to utilize a translucent material for window W, it is to be understood that a transparent material could be used, or the window could be simply an open slot, and the term "window" as used in the following claims, is intended to embrace these equivalents.

I claim:

1. A movie viewer comprising:
    a drum-shaped casing having axially opposed sidewalls and a peripheral rim extending between and joining said sidewalls, said casing having a viewing area adjacent one of said sidewalls amd a storage area adjacent the other sidewall;
    an eyepiece in said rim on a generally diametrical optical axis;
    a light admitting window in said rim, intersected by said axis and disposed diametrically opposite said eyepiece;
    film-driving means comprising a hand crank and a crankshaft journalled in said one sidewall on an axis extending transversely thereof, and a sprocket mounted on the inner end of said shaft in adjacent parallel relation to said one sidewall;
    a movie film within said casing, arranged in an endless coil including at least one idling turn disposed in said storage area and a single turn extending from said storage area into said viewing area in a reentrant loop projecting radially inwardly and intersecting said optical path in front of said eyepiece, and returning into said storage area, said film having a succession of image frames thereon;
    and guide means directing said single turn into said viewing area, positioning it in intersecting relation to said optical axis with said image frames successively centered thereon, returning it into said storage area, and retaining the remainder of said film, including said idling turn, in said storage area;
    said guide means guiding all turns of said film for movement in a circular path adjacent said rim along an arc of more than 180° substantially centered on said light window;
    said idling turn including a generally chordal portion spaced radially inwardly from said rim at said eyepiece and crossing said reentrant loop above and below said optical axis;
    said chordal portion and said reentrant loop being confined laterally in said storage area and viewing area respectively;
    said sprocket having a few driving teeth engageable with said reentrant loop of the film on the crown side thereof in intermittent driving relation thereto.

2. A viewer as defined in claim 1, wherein said reentrant loop and said idling turn's chordal portion have their adjacent edges, at their crossings, adapted to have interengagement to prevent lateral shifting of either said loop or chordal portion out of its respective area.

3. A viewer as defined in claim 1, said crank shaft axis being spaced radially from said optical axis with a spacing such as to establish initial driving engagement of each successive sprocket tooth with the crown portion of said reentrant loop of the film at substantially the point of arrival of the tooth at the optical axis.

4. A viewer as defined in claim 3, wherein the crank shaft axis is spaced above the optical axis and the movement of the sprocket tooth in driving engagement with the film, is upward.

5. A viewer as defined in claim 1, wherein said guide means includes a pair of projections in said viewing area, attached to said one sidewall and spaced from said other sidewall to provide gaps through which said remainder of the film may move circumferentially adjacent said window, said projections extending toward said eyepiece, parallel to said optical axis, respectively from upper and lower extremities of said window, and being positioned to retain said remainder of the film, along said arc in said storage chamber in the area thereof adjacent said window.

6. A viewer as defined in claim 1, wherein said guide means further includes a guide lug in said storage chamber, spaced inwardly from the inner end of said eyepiece to provide a gap through which said remainder of the film may move circumferentially, crossing the path of said reentrant loop above and below said eyepiece and, at the crossings thereof, cooperating with said guide lug to retain said reentrant loop in said viewing chamber.

7. A viewer as defined in claim 8, wherein said guide lug projects toward the center of the casing past the periphery of said sprocket to prevent said reentrant loop from displacement toward said storage chamber.

8. A viewer as defined in claim 6, wherein there are several of said idling turns including respective chordal portions passing said eyepiece in said gap and having sliding bearing engagement with the end of an inwardly projecting boss of said casing, in which said eyepiece is mounted.

9. A viewer as defined in claim 1, said guide means including inner and outer pairs of guide rods attached to said one sidewall and projecting laterally toward the other sidewall in said viewing chamber, said inner pair being spaced respectively above and below and adjacent said optical axis and adjacent the periphery of said sprocket, said outer pair being spaced diagonally outwardly away from said inner pair and toward said rim, said reentrant loop being trained around the inner sides of said inner pair and around the outer sides of said outer pair; and an aperture plate having ends mounted to the respective guide bars of said inner pair.

* * * * *